June 11, 1957   C. W. DALZELL   2,795,475
CONDITION RECORDING APPARATUS
Filed Dec. 2, 1952   2 Sheets-Sheet 1

INVENTOR
Clarence W. Dalzell.

BY Robert F. Peck
ATTORNEY

INVENTOR
Clarence W. Dalzell.
BY Robert F. Peck
ATTORNEY

United States Patent Office 2,795,475
Patented June 11, 1957

2,795,475
CONDITION RECORDING APPARATUS

Clarence W. Dalzell, Towson, Md., assignor to Bendix Aviation Corporation, Baltimore, Md., a corporation of Delaware Application December 2, 1952, Serial No. 323,567

6 Claims. (Cl. 346—8)

This invention relates generally to improvements in condition recording apparatus and in particular relates to an improved device for recording the direction of wind flow.

In the condition recording art, the ever increasing tendency influencing design of such equipment is a desire to locate the condition-responsive elements in such way that maximum response to the condition being measured is obtained, and then have a suitable transmitting system for reproducing the condition sensed at a location remote from the location of the sensing element for purposes of proper indicating and/or recording. In the usual installation for measuring and recording a plurality of meterological conditions, such as wind speed, wind direction, temperature and humidity, it is desirable to have the wind-responsive element conveniently mounted on the highest point in elevation of the location being studied. The wind vane freely rotates under the influence of the wind driving it, and such motion readily suggests the use of a synchronous motor follow-up system for reproducing at a remote location the exact direction of the wind.

Synchronous motor follow-up systems have been developed to the point where they are extremely accurate, dependable and simple, and such systems are ideal for application to a wind-direction recording system. However, there is one major obstacle which must be overcome in using such a system, in that the wind vane will rotate freely, thereby causing the output shaft of the synchronous follow-up system to have a corresponding number of rotations. Conventional wind-direction chart recorders have a chart width ordinarily no greater than ten inches and show the wind direction in rectilinear rectangular and arcuate coordinates; that is to say, a suitable pen moves back and forth across the chart to show the direction of the wind, and the chart, of course, moves with respect to the pen to project the element of time into the record so that at any instant the precise direction of the wind is recorded.

With the use of a synchronous follow-up system it is obvious that some means must be incorporated to confine the movement of the pen to the boundaries of the chart, otherwise continued revolutions of the receiver-synchronous motor shaft would cause the recording pen to pass beyond the boundaries of the chart and thus introduce blank spots in the record, thereby rendering such equipment worthless.

Accordingly, it is an object of the present invention to provide a wind-direction recorder having novel means for preventing the pen arm from passing beyond the boundaries of the recorder chart in either direction upon continued revolution of the wind vane in either direction.

It is another object of the present invention to provide simple and effective means for limiting the travel of the recorder pen without introducing additional mechanical loading in the system.

In the particular recorder illustrating the principle of the subject invention, there is provided a recorder pen swinging through an arcuate path of pre-determined length corresponding to approximately one and one-half revolutions of a wind vane. A chart cooperating with the pen is provided with a series of spaced parallel arcuate coordinates running the entire length of the chart, and these arcuate coordinates are intersected by a series of parallel spaced straight lines running the length of the chart. Thus there is provided on the chart a pair of co-operating coordinates, the straight lines showing direction across the width of the chart and the arcuate lines showing time along the length of the chart.

It has been found that a very practical recorder for wind direction embodies a chart scale having a width representing one and one-half revolutions of a wind vane, which of course means that the wind direction represented by the vertical coordinates shows a repetitive pattern of wind direction for 180 degrees in addition to the normal 360 degrees pattern. Thus, if the direction north is shown on the chart at the left-hand side thereof, the chart will show in the following order, starting with north, the directions east, south, west, and then repeating itself, north, east and south.

Heretofore attempts to use a synchronous follow-up system have required the use of expensive cam mechanisms located between the recording pen and the receiver-synchronous motor. Such cam mechanisms will permit the pen arm to reach the limit of its travel in either direction across the chart and then forcibly reverse the direction of the pen arm for a full 360 degrees across the chart. Such a system gives a continuous record of wind direction on a chart, but is very difficult to manufacture. The cam mechanism embodied in such a system has to be hand-finished for each particular recorder, and also requires a degree of loading on the receiver-synchronous motor that reduces the accuracy of such motor, thereby affecting the over-all performance of the recorder.

The novel invention disclosed herein embodies the use of a simple disc motor for replacing the complicated and expensive cams heretofore used, resulting in a less expensive recorder and one having vastly improved characteristics of performance. The armature of the disc motor is permanently affixed to the shaft of the receiver-synchronous motor and rotates with it continuously. Suitable field pieces cooperate with the rotating armature to provide the necessary torque for reversing the pen arm and, unlike a cam system, no friction is introduced by virtue of the reversing motor. When the wind direction is such that the pen arm merely oscillates between the edges of the recorder chart, the reversing motor is de-energized and at the most operates as a damper for the oscillation of the pen arm. However, by the use of suitable contacts actuated by movement of the pen arm when the arm comes to the limit of its travel at either edge of the chart, the contacts operate first to de-energize the synchronous follow-up system and then energize the reversing motor. The contacts are arranged so that the field piece selected is such as to cause the pen arm to reverse its direction. Once this reversing cycle begins it continues until the pen arm moves a distance approximating one complete revolution of the wind vane. Because the synchronous follow-up system is de-energized, there is no opposition to the reversing motor and such reversal is accomplished quickly and with a minimum of power. As the reversing cycle nears completion, which can be a predetermined angular distance a little less than 360 wind-direction degrees, the contacts carried by the pen arm operate to first de-energize the reversing motor. The inertia of the system carries the pen in the same direction, and after a predetermined interval of time elapses, the synchronous system is re-energized and locks in phase, ready to continue movement of the recording pen. The complete reversing cycle takes very little time and there is no chance for the transmitting synchronous motor to get out of phase with the receiving synchronous motor by more than a few degrees. Such displacement of the phase of the two synchronous motors is allowed for by having the reversing motor de-energized slightly before completion of the complete reversal cycle.

The entire system can be connected to conventional alternating current power sources and the entire assembly can be reduced to a very simple and effective mechanism.

The above objects and advantages of the subject invention will be best understood upon reference to the detailed specifications set forth below, when taken in conjunction with the drawings annexed hereto, in which.

Figure 1:
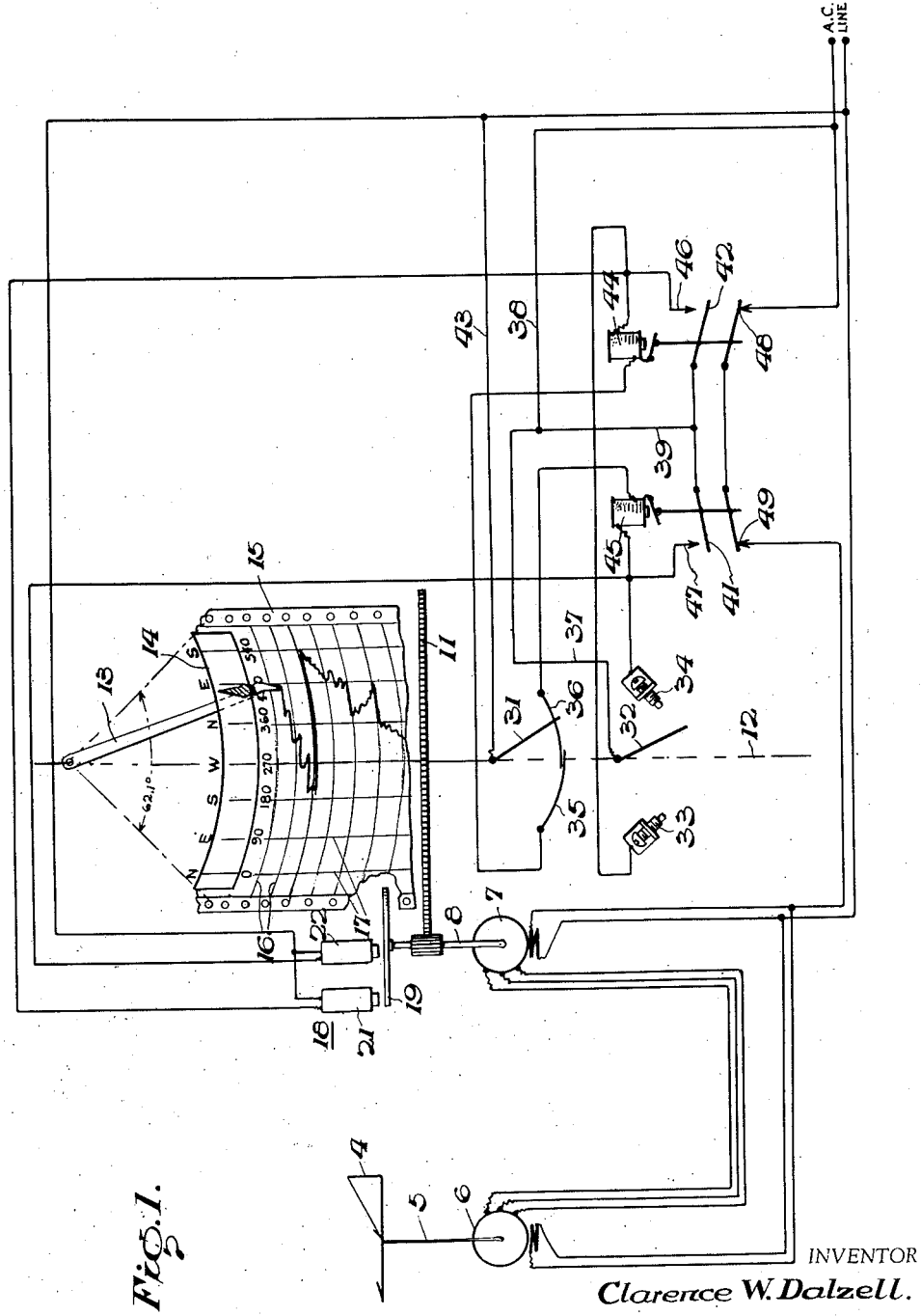
Figure 1 is a combination electro-mechanical schematic arrangement of a complete wind-direction recording system.

Referring to Figure 1, there is shown a wind vane 4 having its output shaft 5 connected to the rotor of a self-synchronous transmitting motor 6, hereinafter referred to as a transmitting synchro. The synchro 6 is of a conventional type, having a single-phase rotor and a three-phase stator. As shown in Figure 1, the single-phase rotor is connected to a source of A. C. power, and the three-phase stator is connected by suitable leads to the three-phase stator of a self-synchronous receiver motor 7, hereinafter referred to as the receiver synchro. The receiver synchro has its single-phase rotor winding connected across the A. C. power source, and in a manner well known in the art, it will be understood that any change in position in the rotor of transmitting synchro 6 causes the rotor of receiver synchro 7 to follow-up and assume an identical position. This self-synchronous follow-up system is a conventional arrangement in wind-direction recording systems and forms no part of the subject invention.

Figure 2:
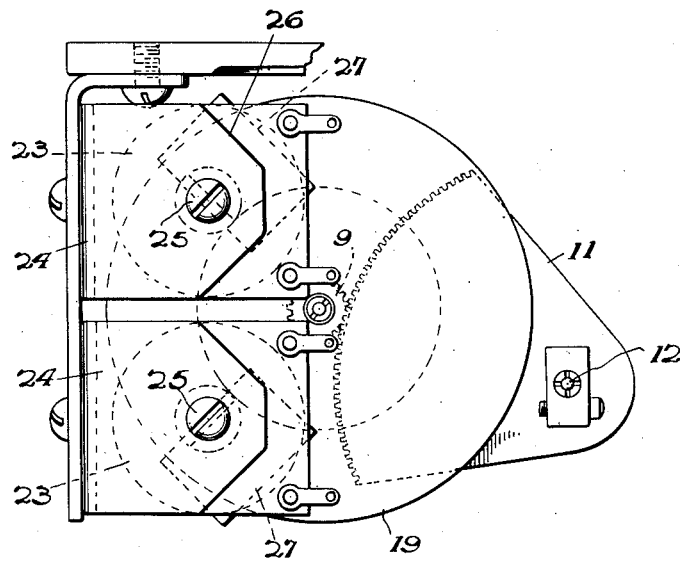
Figure 2 is a plan view of the novel reversing motor, showing the armature and field pieces, in addition to the pinion and sector gear.

The rotor of the receiving synchro 7 has an output shaft 8, to which is affixed near its outer extremity a pinion 9, which in turn cooperates with a sector gear 11, suitably mounted for rotation about the axis 12. The sector is best shown in Figure 2, and the axis 12 may be in the form of a continuous shaft having a pen 13 at its upper extremity. This shaft may carry a pair of moving contacts, hereinafter described in fuller detail. Cooperating with the pen 13 is a scale 14 and a moving chart 15.

The chart 15 has a series of parallel spaced horizontal arcuate coordinates 16 running the entire length thereof, and also has a series of spaced parallel vertical straight-line coordinates 17 running the length of the chart. The edges of the chart are perforated to cooperate with a suitable drive mechanism (not shown nor forming any part of the subject invention) and from the arrangement so far described it is obvious that the pen 13 will trace on the moving chart a continuous record of the direction of wind flow.

Considering this portion of the assembly so far described, as the wind vane 4 rotates, the transmitting synchro 6 will respond to this rotation of the wind vane and cause the receiver synchro to position the pen 13 to show and record the instantaneous wind direction. It is to be noted that the gear ratio between the pinion 9 and the gear sector 11 is such that one revolution of the receiver synchro will cause the pen arm 13 to travel through an angle of approximately 41.4 degrees. Manifestly, one revolution of the receiver synchro corresponds to a 360 degree change in wind direction.

It has been found that a scale representing 540 degrees change in wind direction is most practical, and upon reference to Figure 1 it is shown that the scale selected is one representing 540 degrees change in wind direction, and for the particular scale shown, the left-hand limit of the chart is designated as the direction north, and the directions east, south, west, north, east, south follow, respectively, with the last mentioned south defining the other limit of the chart 15.

Assuming that the wind is coming in a northerly direction and the recorder has just commenced operation, the pen will trace a record on the chart along the left-hand limit of the chart surface. If the wind should change in direction in a clockwise manner, the pen will move to the right across the chart, showing the change in wind direction. In Figure 1, at the bottom of the portion of the chart shown, the wind has undergone a complete 360 degree change and is passing through north for the second time, onto the direction east. Such a condition means that the transmitting and receiving synchros have passed through one complete revolution. Now as the wind continues to change direction, shifting from east to south, the pen arm will continue to move to the right of the chart and, with a continued change in direction, would move off the chart and thereby render the recording apparatus inoperative.

Figure 3:
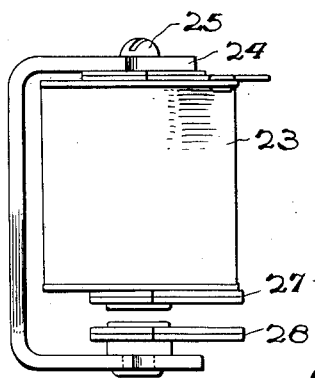
Figure 3 is a view in elevation of one of the field pieces shown in Figure 2.

It is obvious that some means must be provided to prevent the pen arm 13 from leaving the chart, and to this end the subject invention provides for a novel pen reversal mechanism, whereby upon reaching the edge of the chart in either direction the pen is reversed and caused to move across the chart a distance equivalent to substantially one complete revolution of the receiving synchro. This pen reversal is accomplished by means of a novel disc-motor generally indicated at 18, having an armature in the form of a copper disc 19 cooperating with the field pieces 21 and 22. The details of the disc motor are best shown in Figures 2 and 3, and referring first to Figure 3, it is seen that the field pieces comprise suitable electro-magnets having a coil 23 surrounding a magnetic core and clamped to a pole piece 24 by a suitable screw 25. The pole piece 24 is in the form of a U-shaped member, having its upper leg in the form shown at 26, wherein the corners normally associated with such pole piece are removed. The core projecting through the bottom of coil 23 carries a substantially rectangular, punched-out copper slug 27 in the form of a short-circuited turn, and a like slug 28 is carried by the bottom leg of the pole piece 24, there being an air gap separating the two slugs. The core and projecting pole face carrying the slugs 27, 28 may have milled slots therein for receiving one leg of the slugs, and by suitable staking the parts can be held rigidly together.

These slugs are eccentrically placed with respect to the axis of the electro-magnet, and if a copper disc is inserted in the air gap, energization of the electro-magnet will, according to the well-known principles of Lenz's Law, cause the disc to rotate. The operation of the motor 18 is similar to that of a "vane type" Railroad Switching Relay, the theory of operation of which is clearly and concisely discussed on pages 6–8 of the booklet entitled "American Railway Signalling Principles and Practices," chapter V, Alternating current relays, published in 1927 by the American Railway Association, signal section.

By properly arranging the electro-magnets and associated copper slugs around the periphery of the disc 19, selective energization of the electro-magnets will cause reversal in the direction of motion of the disc.

With the operation of the disc motor 18 now understood, it will be evident that if means could be provided to energize this motor at the appropriate time in the recording cycle, a simple and effective reversal of pen motion could be achieved. It is to be noted that the disc 19 is mounted on the end of the rotor shaft of receiver synchro 7, and in a normal de-energized condition of the motor, no additional mechanical or frictional loading is imposed on the receiver synchro by virtue of the arrangement shown. The reversing motor can be so designed that the moment of inertia of the disc 19 provides a slight degree of damping during normal operation of the recorder.

To accomplish the selective operation of the reversal motor 18, a simple relay and associated contact network is provided. Again referring to Figure 1, there is shown a pair of moving contacts 31, 32. These contacts move in substantial synchronism with the pen arm 13; in the case of contact arm 32 it cooperates with a pair of stationary, adjustable contacts 33, 34, and in the case of contact arm 31, it cooperates with a pair of stationary arcuate contacts 35, 36. The exact contact structure is a matter of choice to those skilled in the art, so long as the schematic principles of operation shown are retained.

The moving contact 32 is connected by means of leads 37, 38 to one side of the A. C. line. This contact also connects by means of lead 39 to the relay-actuated contacts 41, 42.

The contact 31 is connected by means of lead 43 to the other side of the A. C. line and the contacts 35, 36 are connected to one side of the electro-magnetic relays 44, 45, respectively. The stationary adjustable contacts 33, 34, are connected by suitable leads to the other side of the relays 44, 45, respectively.

The field pieces 21, 22 of reversing motor 18 have one side connected together by means of suitable leads, and this common connection is connected to one side of the A. C. line. In the case of field piece 21, the connection to the other side of the line is achieved by means of a lead connected to a fixed contact 46 on relay 44, and in the case of field piece 22 its connection to the other side of the line is by means of a suitable lead connected to the fixed contact 47 of relay 45. The relays 44, 45 also have cooperating contacts 48, 49 which are located in one of the leads connecting the transmitting and receiving synchros to the A. C. line.

With the above arrangement of parts in mind, it is seen that as the pen arm 13 moves to the right of the chart 15, such motion will also cause the moving contact 32 to move toward the stationary contact 34. At the moment the wind reaches a true south position, the contacts 32, 34 will make contact and cause the relay 45 to become energized. Upon energization of this relay the cooperating contact 49 first separates, which de-energizes the synchros, which has the effect of rendering the receiver synchro torqueless. Next, the contacts 47, 41 close, which cause energization of the field piece 22. The reversing motor 18 now operates to move the pen across the chart in a direction opposite to that imparted by the receiver synchro. The first effect of the operation of motor 18 is to separate the contacts 32, 34. However, the relay 45 remains energized through its front contacts 47, 41 and the separation of contacts 32, 34 thus has no effect on its associated relay. As the motor 18 continues to operate, the pen 13 continues to move to the left on the chart and the contact 31 moves in synchronism therewith. When the pen has moved through substantially 360 wind-direction degrees motion, the contacts 31, 36 are separated and this causes immediate de-energization of the relay 45. Upon the happening of this event the contacts 47, 41 are separated and the mootr 18 is de-energized. After a discrete interval of time, the cooperating contacts 41, 49 will close and re-energize the self-synchronous follow-up system. When this happens the two synchros will lock in phase and be ready to function in a normal manner. For example, if the wind continues to change in direction through south and onto west, the pen again will move to the right of the chart as shown in Figure 1. By de-energizing the reversing motor 18 slightly before re-energization of the self-synchronous system, due allowance is made for any slight out-of-phase relationship of the two synchros by virtue of any motion that may be imparted to the rotor of the transmitting synchro by the wind vane during the reversing cycle. The reversing cycle takes about three seconds and thus there is very little chance for the synchros to get out of phase by any significant amount.

In the event that the pen arm 13 moves to the left-hand limit of its travel across the chart 14, identical operation will take place as that described above, only in this case the pen reversal motion will be in a direction to the right across the chart. Contacts 32, 33 control the operation of the system for this type of reversal and relay 44 and its associated contacts come into play and control the sequence of events.

It is to be noted that the contacts 33, 34 are adjustable and that changes in adjustment thereof in no way affects the synchronism existing between the receiving synchro and the pen arm. This feature provides for preselection of the exact moment of pen reversal upon travel of the pen to its extreme limit in either direction.

From the above it is seen that a simple and practical arrangement has been provided to prevent the pen arm from leaving the chart at either edge thereof, so that the record produced is a continuous trace of wind direction, no matter how often it may change through a complete 360 degree cycle. The reversing motor adds no mechanical load or friction to the self-synchronous system and the moving contact system permits relatively loose manufacturing tolerances, thereby enhancing the manufacture of the recorder under conditions of maximum economy.

It will be noted that the term "synchro" has been used in the claims appended hereto, and it is felt that such usage is proper and will serve to keep the claims in the simplest and clearest form possible. The term "synchro" is to be considered as a generic term, describing the self-synchronous motors found in the conventional self-synchronous follow-up systems, and described in sufficient detail heretofore in the specifications.

What is claimed and desired to be secured by United States Letters Patent is:

1. Means for recording the angular position of a rotatable member comprising: a recording stylus movable through a path of limited travel and adapted to trace a continuous curve of said position on a moving chart, a self-synchronous follow-up system including a transmitting synchro and a receiving synchro and associated connecting wires and power leads, said rotatable member being connected to said transmitting synchro and said stylus being connected to said receiving synchro whereby said stylus moves proportionately to movement of said rotatable member, said path of limited travel having a predetermined length proportional to at least one complete revolution of said rotatable member, normally de-energized electric motor means operable independently of said receiving synchro for moving said stylus, means operatively connected to and synchronized with the movement of said stylus arranged to deenergize said follow-up system and energize said motor means in successive order when said stylus reaches the limit of its travel in either direction, said motor means moving said stylus in a direction opposite to the direction in which said stylus was travelling prior to energization of said motor means, and means also operatively connected to and synchronized with the movement of said stylus for deenergizing said motor means and reenergizing said follow-up system in successive order when the stylus has been moved by said motor means through a distance proportional to substantially one complete revolution of said rotatable member.

2. The combination as defined in claim 1 wherein said means arranged to deenergize the follow-up system and energize said motor means and also the means for deenergizing said motor means and reenergizing said follow-up system comprise movable contacts operatively connected to and driven in synchronism with the travel of said pen and arranged to engage relatively fixed contacts which are connected in circuit with solenoid means which when energized and deenergized control switch mechanism connected in circuit with said synchros and said electric motor means.

3. Means for recording the angular position of a rotatable wind vane comprising: a recording stylus movable through a path of limited travel and adapted to trace a continuous curve of said position on a movable chart, means for driving said stylus including a receiver synchro, said receiver synchro having its output shaft synchronously following the angular position of said wind vane, means connecting said shaft to said stylus for driving the stylus in relation to rotation of said wind vane, said path of limited travel having a predetermined length proportional to at least one complete revolution of said wind vane, a normally deenergized electric reversing motor operatively connected to said stylus, an electric supply circuit for said reversing motor and said synchro, switch mechanism interposed in said circuit including movable contacts which when moved to one position break the circuit to the synchro and close the circuit to said reversing motor and when in another position close the circuit to said synchro and break the circuit to said reversing motor, solenoid means for controlling said movable switch mechanism, and movable contacts operatively connected to and driven in synchronism with said stylus for energizing and deenergizing said solenoids.

4. Means for recording the angular position of a rotatable member, comprising: a recording stylus movable through a path of limited travel and adapted to trace a continuous curve of said position on a moving chart, said path of limited travel having a predetermined length proportional to at least one complete revolution of said rotatable member, a first motor means responsive to angular movement of said rotatable member and having a driving connection with said stylus for moving the latter proportionately to such angular movement, a normally deenergized second motor means operable independently of said first motor means also having a driving connection with said stylus for moving said stylus, means synchronized with the movement of said stylus arranged to deenergize said first motor means and energize said second motor means in successive order when the stylus reaches the limit of its travel in either direction, said second motor means moving said stylus in a direction opposite to the direction in which said stylus was travelling prior to energization of said second motor means, and means also synchronized with the movement of said stylus for deenergizing said second motor means and reenergizing said first motor means in successive order when the stylus has been moved by said second motor means through a distance proportional to substantially one complete revolution of said rotatable member.

5. Means for recording the angular position of a rotatable member as claimed in claim 4, wherein said second motor means is in the form of an electric motor provided with a disc-type rotating armature having a permanent drive connection with said stylus, said armature when such electric motor is deenergized serving to damp oscillations of the stylus.

6. Means for recording the angular position of a rotatable member, comprising: a recording stylus movable through a path of limited travel and adapted to trace a continuous curve of said position on a moving chart, said path of limited travel having a predetermined length proportional to at least one complete revolution of said rotatable member, a first electric motor responsive to angular movement of said rotatable member and having a driving connection with said stylus for moving the latter a distance proportional to such angular movement, a second electric motor also having a driving connection with said stylus for moving the latter back to a predetermined recording position on the chart should the stylus be driven to the end of its predetermined recording travel in either direction, an electric circuit for said motors, switch mechanism interposed in said circuit, including movable contact members synchronized with the movement of said stylus acting to make and break the circuit to said motors, the arrangement being such that when the stylus reaches the end of said path of limited travel in either direction, said first motor is deenergized and said second motor is substantially simultaneously energized and drives the stylus back to said predetermined recording position, whereupon the said second motor is deenergized and the said first motor is again energized for repetition of the cycle.

References Cited in the file of this patent
UNITED STATES PATENTS

| | | |
|---|---|---|
| 994,677 | Hennah | June 6, 1911 |
| 1,926,640 | Weston | Sept. 12, 1933 |
| 1,958,909 | Chappell | May 15, 1934 |
| 2,419,396 | Frisk | Apr. 22, 1947 |
| 2,439,094 | Miles | Apr. 6, 1948 |
| 2,500,746 | Ellenberger | Mar. 14, 1950 |
| 2,617,947 | Wolf | Nov. 11, 1952 |